United States Patent [19]

Silvey

[11] 4,349,049
[45] Sep. 14, 1982

[54] HYDRAULIC SAFETY HOSE

[76] Inventor: E. Ray Silvey, 1231 Dutton Rd., Eagle Point, Oreg. 97524

[21] Appl. No.: 211,313

[22] Filed: Nov. 28, 1980

[51] Int. Cl.$^3$ .............................................. F16L 55/00
[52] U.S. Cl. .................... 138/103; 138/104; 138/114
[58] Field of Search ................ 138/103, 110, 104, 114

[56] References Cited

U.S. PATENT DOCUMENTS

| 2,859,776 | 11/1958 | McKenzie | 138/103 |
|---|---|---|---|
| 3,830,290 | 8/1974 | Thamasett et al. | 138/104 |
| 3,831,635 | 8/1974 | Burton | 138/103 |
| 4,153,079 | 5/1979 | Ambrose | 138/103 |
| 4,259,553 | 3/1981 | Tanaka et al. | 138/103 |

OTHER PUBLICATIONS

Sales Literature-Synflex 3R10/3E10, "Very High Pressure Hose", p. 14, [Exhibit A].
Sales Literature-Synflex "Accessories", p. 38, [Exhibit B].
Sales Literature-Synflex "Acdessories", (Cont'd), p. 39, [Exhibit C].

Primary Examiner—Willis Little
Attorney, Agent, or Firm—Klarquist, Sparkman, Campbell, Leigh, Whinston & Dellett

[57] ABSTRACT

A hydraulic safety hose apparatus is disclosed, which includes a pressurized fluid source for producing hydraulic fluid pressure in the apparatus, a hydraulic safety hose, and a hydraulic pump. The hydraulic safety hose is composed of inner and outer hoses with an annular passage between them to receive pressurized fluid in the event of rupture of the primary inner hose. A series of bleed holes in the outer hose allows the escaping fluid to harmlessly dissipate under low pressure without endangering the operator and other persons in the vicinity of the hydraulic system.

10 Claims, 3 Drawing Figures

HYDRAULIC SAFETY HOSE

BACKGROUND OF THE INVENTION

The present invention relates to an improved hydraulic safety hose for use in a hydraulic system such as, for example, a hydraulic tree-felling system.

In standard logging practice, large trees are frequently felled by placing one or more hydraulic jacks within a back cut in a standing tree. When the tree is partially cut but still standing, an operator applies hydraulic pressure to the jacks by using a hydraulic pump connected to the jacks by hydraulic pressure hoses. Upon the application of such pressure, the tree falls in a direction determined by the placement of the back cut.

A conventional hydraulic pressure hose does not provide the operator or other nearby workers with any protection in the event of a hose rupture. This deficiency may result in physical injury to such persons caused by the rapid, uncontrolled release of hydraulic fluid under high pressure. Available guards for hydraulic hoses are designed only to protect each end of the hose from abrasion and physical abuse. They do not protect nearby persons from the sudden release of high energy fluid if the hose ruptures.

Accordingly, there is a need for a safe high pressure hose that will prevent the release of a high energy stream of fluid capable of causing injury in the event of rupture.

A primary object of the invention is, therefore, to provide a means by which high pressure hydraulic fluid escaping from a ruptured hydraulic line can safely be dissipated without causing injury to the operator or others nearby. A secondary object is to provide abrasion protection along the entire length of a pressure hose.

SUMMARY OF THE INVENTION

In accordance with the present invention, the foregoing objects are fulfilled by providing a secondary pressure hose which surrounds the primary hydraulic pressure hose along the entire length of the primary hose. The inner diameter of the secondary hose is sufficiently large to provide a passage through which escaping hydraulic fluid is channeled upon rupture of the primary hose. Bleed orifices strategically positioned in the secondary hose allow fluid from the ruptured primary hose to safely vent to atmosphere under low pressure.

The foregoing and other objects, features and advantages of the present invention will be more readily apparent from the following detailed description, which proceeds with reference to the accompanying drawings.

DESCRIPTION OF A PREFERRED EMBODIMENT

Figure 1:
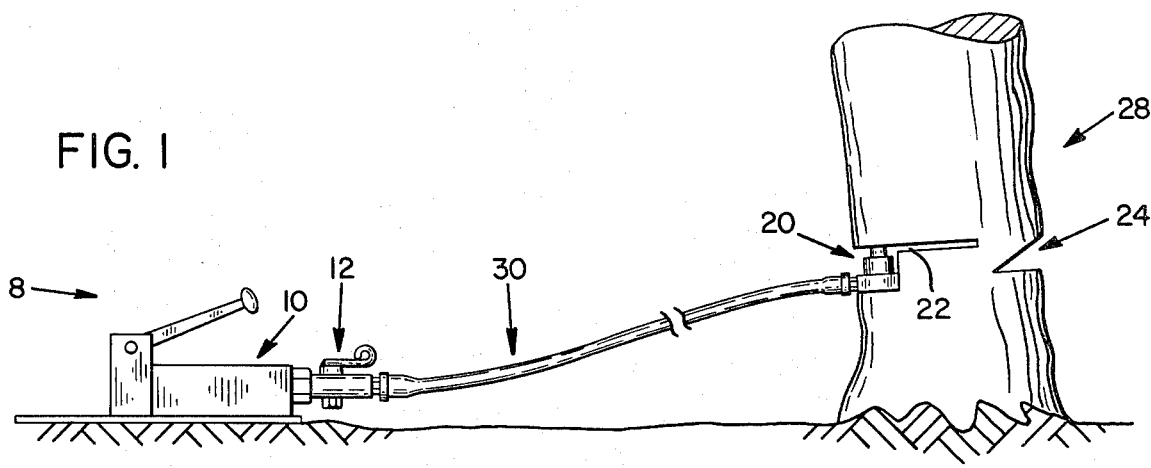
FIG. 1 is a schematic elevational view of a tree-felling system using a safety hose in accordance with the present invention.

Referring to the drawings, in FIG. 1, a tree-felling system, designated generally at 8, includes a hydraulic fluid pump 10 in fluid communication with a safety check valve 12, the valve preferably being of the type disclosed in my copending U.S. patent application, Ser. No. 108,666, filed Dec. 31, 1979. A hydraulic jack 20 is placed in a back cut 22 after an undercut 24 is made in a tree 28 to be felled. A preferred hydraulic jack for the system 8 is disclosed in my U.S. Pat. No. 4,119,298. A hydraulic safety hose 30 of the invention connects hydraulic pump 10 and its associated check valve 12 to hydraulic jack 20.

The hydraulic fluid pump 10 may comprise any suitable hydraulic pumping means, such as, for example, the hand-operated pump disclosed in my U.S. Pat. No. 4,026,524. The preferred hydraulic fluid pump 10 should be pressure limited to provide a maximum hydraulic pressure equal to the peak working pressure of jack 20.

Figure 2:
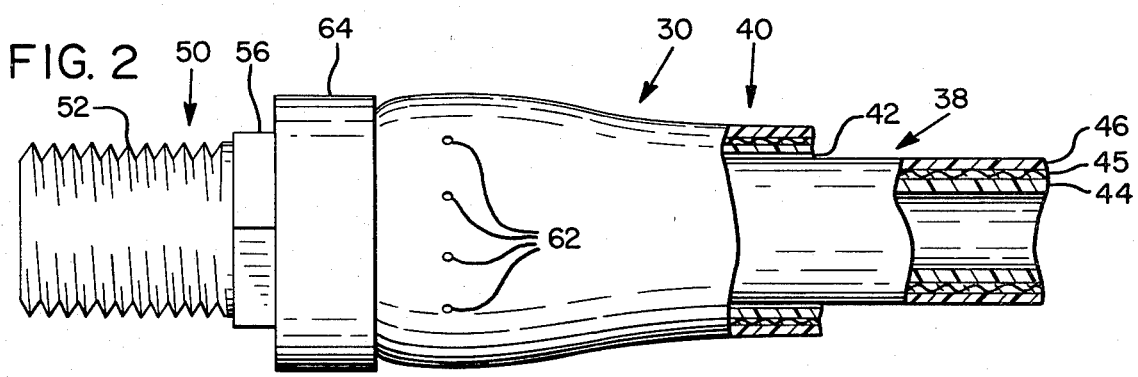
FIG. 2 is an enlarged view, partly in section, of one end portion of the safety hose of FIG. 1, including its end fitting.
Figure 3:
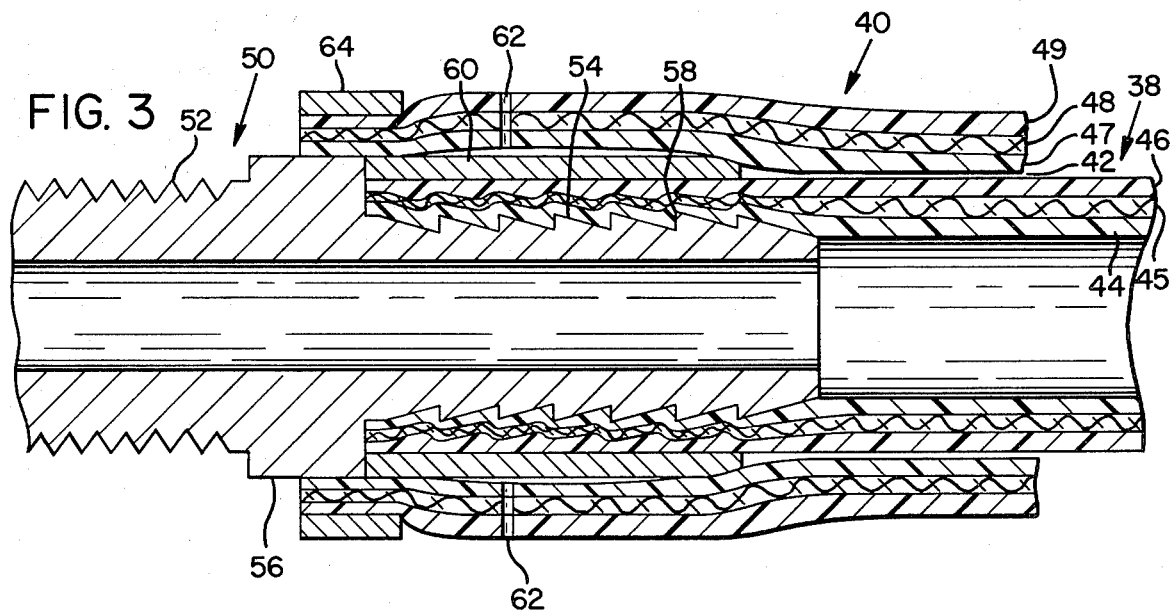
FIG. 3 is a full cross-sectional view of the safety hose portion shown in FIG. 2 on a still larger scale, showing a preferred coupling arrangement.

Now referring to FIGS. 2 and 3, the details of hydraulic safety hose 30 will be described. With particular reference to FIG. 2, safety hose 30 includes an inner, flexible primary hydraulic pressure hose 38, within which the hydraulic working fluid under pressure is normally confined, and an outer, flexible secondary hose or tube 40. The outer hose 40 surrounds primary hose 38, and the two hoses are substantially coextensive in length. The inside diameter of outer hose 40 is slightly greater than the outside diameter of inner hose 38, so as to create an annular passageway 42 therebetween. Although the width of the passageway is not critical, a difference in such diameters of ⅛ of an inch has been found to perform satisfactorily.

The inner hose 38 typically comprises a conventional flexible, hydraulic, high pressure hose, including an inner, relatively rigid, nylon core tube 44 surrounded by a synthetic fiber braid layer 45 and a polyurethane outer jacket 46. Such a hose is available commercially, for example, a Synflex brand hose, model 3R10, manufactured by Synflex Division of Samuel Moore and Company of Mantua, Ohio.

The outer hose 40 comprises an inner polyurethane tube 47 surrounded by a synthetic fiber braid layer 48, and an outer polyurethane jacket 49. Such hose is also available commercially under the Synflex brand name.

A hydraulic connector fitting 50, of a conventional type, includes a threaded outer end 52 and an annularly ridged inner end 54, separated by an enlarged hexagonal wrenching boss 56. The ridged inner end 54 of fitting 50 projects into an open end of inner hose 38, and is held in place by an interference fit between ridges 58 of the fitting and core 44 of the inner hose 38. A metal sleeve 60 surrounds each end of the inner hose 38 so as to prevent buckling of the inner hose when being connected to fitting 50 and to help secure the fitting.

A bleed orifice means comprising a plurality of bleed holes 62 is provided at one, and preferably both, ends of outer hose 40. Bleed holes 62 are spaced apart about the circumference of the outer hose, directly over the sleeve 60 of inner hose 38. The placement of the bleed holes 62 in this manner, precludes the possibility of the inner hose rupturing directly below a bleed hole, and thereby possibly causing the outer hose 40 to simultaneously fail.

Bleed holes 62 provide a fluid passage between the annular passageway 42 and the outer surface of outer hose 40, allowing fluid from a ruptured inner hose to bleed under low pressure through the outer hose to atmosphere, thereby gradually dissipating the high energy released upon rupture of the inner hose.

An annular ring 64 clamps each end of outer hose 40 to the hexagonal boss 56 of fitting 50. Thus, when the length of inner hose 38 increases when pressurized, the length of outer hose 40 will increase with it so that they will remain substantially coextensive in length.

Operation

In operation, the inner primary hose 38 confines the hydraulic pressure created by the hydraulic fluid pump 10, and thus, normally no load is applied to the outer secondary hose 40. As hydraulic pressure builds within inner hose 38, the inner hose expands in length and forces the outer hose 40 to correspondingly lengthen, since annular ring 64 rigidly secures the outer hose to fitting 50.

If inner hose 38 ruptures, the escaping hydraulic fluid and resulting pressure are confined within the hydraulic safety hose 30 by the presence of the outer secondary hose 40. The escaping fluid is forced by the hydraulic pressure originating from the inner primary hose 38, through the annular passageway 42, and is safely released from the system 8 under low pressure through bleed holes 62.

It is theorized that the energy of the fluid escaping from the inner hose 38 is dissipated principally by three factors, namely, (1) the increased volume provided by annular passageway 42, thereby lowering the pressure within the hydraulic safety hose 30; (2) the energy required to open annular passageway 42 to its maximum volume; and (3) the energy required to separate the outer hose 40 from contact with the upper edge of the sleeve 60 of inner hose 38 (see FIG. 3).

In practice, the present invention has been found to dissipate the energy of escaping fluid from a rupture in the inner hose 38, such that hydraulic fluid passes through bleed holes 62 in a mere trickle.

Although a preferred embodiment of the invention has been described in detail, it is to be understood that various modifications can be made therein without departing from the spirit and scope of the invention, as defined in the appended claims. For example, it is believed that the invention would be operable if the bleed holes were positioned at other locations along the length of the outer hose, or if the bleed holes were eliminated and an unclamped end of the outer hose provided an annular bleed orifice.

I claim:

1. A hydraulic safety hose comprising:
an inner primary fluid pressure hose for transmitting fluids under high pressure;
an outer secondary fluid pressure hose surrounding and substantially coextensive in length with said inner primary hose,
said outer and inner hoses being sized to provide an annular fluid passageway therebetween;
said secondary hose including a bleed orifice means which in the event of rupture of said inner primary hose enables pressurized fluid passing into and through said annular passageway to pass safely through said bleed orifice means outwardly of the secondary hose under low pressure.

2. A safety hose according to claim 1, wherein said bleed means comprises at least one bleed hole through said outer secondary hose inwardly of the opposite ends thereof.

3. A hydraulic safety hose comprising:
an inner primary fluid pressure hose;
an outer secondary fluid pressure hose surrounding and substantially coextensive in length with said inner primary hose, said outer and inner hoses being sized to provide an annular fluid passageway therebetween;
said secondary hose including a bleed means whereby in the event said inner primary hose ruptures, pressurized fluid passing into and through said annular passageway safely passes through said bleed means outwardly of the secondary hose under low pressure,
said bleed means comprising a plurality of bleed holes spaced apart circumferentially about an end portion of said outer secondary hose.

4. A safety hose according to claim 1 including coupling means affixed to each end of said hose, said coupling means comprising a fitting with an end portion projecting into an open end of said inner hose and held in place by an interference fit with said inner hose, the corresponding end portion of said outer hose overlapping said fitting end portion, said bleed means comprising a bleed hole extending through the overlapping end portion of said outer hose.

5. A safety hose according to claim 4 including a sleeve member surrounding said inner hose end portion overlying said fitting, said overlapping end portion of said outer hose including said bleed hole overlying said sleeve member.

6. A hydraulic safety hose according to claim 4 including a rigid sleeve surrounding the end portion of said fitting and corresponding end portion of said inner hose, the corresponding end portion of said outer hose overlapping said sleeve with an interference fit, said bleed means being operable to transmit fluid under low pressure and velocity from said outer hose in the region of said sleeve.

7. A hydraulic safety hose comprising:
an inner primary fluid pressure hose;
an outer secondary fluid pressure hose surrounding and substantially coextensive in length with said inner primary hose, said outer and inner hoses being sized to provide an annular fluid passageway therebetween;
said secondary hose including a bleed means whereby in the event said inner primary hose ruptures, pressurized fluid passing into and through said annular passageway safely passes through said bleed means outwardly of the secondary hose under low pressure;
coupling means affixed to each end of said hose,
said coupling means comprising a fitting with an end portion projecting into an open end of said inner hose and held in place by an interference fit with said inner hose, the corresponding end portion of said outer hose overlapping said fitting end portion;
said overlapping end portion of said outer hose extending lengthwise beyond the corresponding end of said inner hose and beyond said fitting end portion onto an enlarged intermediate portion of said fitting; and annular ring means securing said overlapping end portion to said enlarged intermediate portion of said fitting;

said bleed means comprising plural bleed holes spaced apart circumferentially about said outer hose inwardly of said ring means.

8. A hydraulic safety hose comprising:

an inner primary fluid pressure hose for transmitting fluids under high pressure, and an outer secondary hose surrounding and substantially coextensive in length with said inner primary hose, said outer hose having at least a portion of its length which is fluid permeable so as to dissipate fluid under low pressure through said permeable portion in the event of rupture of said inner hose;

said outer and inner hoses being sized to provide an annular fluid passageway therebetween.

9. A hydraulic safety hose comprising:

an inner primary fluid pressure hose;

an outer secondary fluid pressure hose surrounding and substantially coextensive in length with said inner primary hose so as to sheath the full length of said primary hose, said outer and inner hoses being sized to provide an annular fluid passageway therebetween;

said secondary hose including a bleed means in fluid communication with said passageway such that in the event said inner primary hose ruptures, pressurized fluid passing into and through said annular passageway safely passes through said bleed means outwardly of the secondary hose under low pressure and velocity, said bleed means comprising a bleed orifice through an end portion of said outer secondary hose.

10. A hydraulic safety hose comprising:

an inner primary fluid pressure hose for transmitting fluids under high pressure; and a discrete, outer secondary fluid pressure hose surrounding and substantially coextensive in length with such inner primary hose so as to sheath the full length of said primary hose;

said secondary hose including a bleed orifice means which enables pressurized fluid to pass therethrough and outwardly of said secondary hose under low pressure, said primary and secondary hoses being sized to allow pressurized fluid escaping from a rupture in said primary hose to flow along an axially extending interface formed by said primary and secondary hoses to said bleed orifice means.

* * * * *